United States Patent
Simms

Patent Number: 6,155,573
Date of Patent: Dec. 5, 2000

[54] REMOVABLE AND REPLACEABLE HUB SEAL

[75] Inventor: David M. Simms, Elgin, Ill.

[73] Assignee: SKF USA Inc., Elgin, Ill.

[21] Appl. No.: 09/095,436

[22] Filed: Jun. 10, 1998

[51] Int. Cl.[7] .................................................. F16J 15/34
[52] U.S. Cl. ............................................................ 277/373
[58] Field of Search ..................................... 277/327, 370, 277/371, 373, 375, 394, 455, 548, 549, 551

[56] References Cited

U.S. PATENT DOCUMENTS

| | | |
|---|---|---|
| 2,263,653 | 11/1941 | Smith et al. . |
| 2,830,832 | 4/1958 | Moorman et al. . |
| 4,210,220 | 7/1980 | Balter . |
| 4,226,426 | 10/1980 | Messenger ........................ 277/370 X |
| 4,345,739 | 8/1982 | Wheatley . |
| 4,457,523 | 7/1984 | Halling et al. . |
| 4,552,367 | 11/1985 | Fedorovich et al. . |
| 4,819,973 | 4/1989 | Pegon . |
| 5,201,528 | 4/1993 | Upper ....................................... 277/394 |
| 5,433,456 | 7/1995 | Nicholson . |
| 5,794,476 | 8/1998 | Smietanski ........................ 277/375 X |

*Primary Examiner*—Anthony Knight
*Assistant Examiner*—Karlena D. Schwing
*Attorney, Agent, or Firm*—James T. FitzGibbon; Vedder, Price, Kaufman & Kammholz

[57] ABSTRACT

A one-piece, reusable hub seal unit for heavy duty axles and the like. The unit includes a stiff but flexible casing covered with an elastomeric portion. The casing has a radial flange, a slightly axially inclined sleeve portion, and a purely axial portion ending in a free edge. The elastomeric covering is thin adjacent the free edge, gradually increases in thickness throughout the slightly inclined axial extent and finally contains a radial section covering the flange and having two or more sealing ribs. A cover holds the seal unit in place when it seals snugly in the counterbore. When the cover is removed, the seal may be removed by hand from the counterbore.

11 Claims, 3 Drawing Sheets

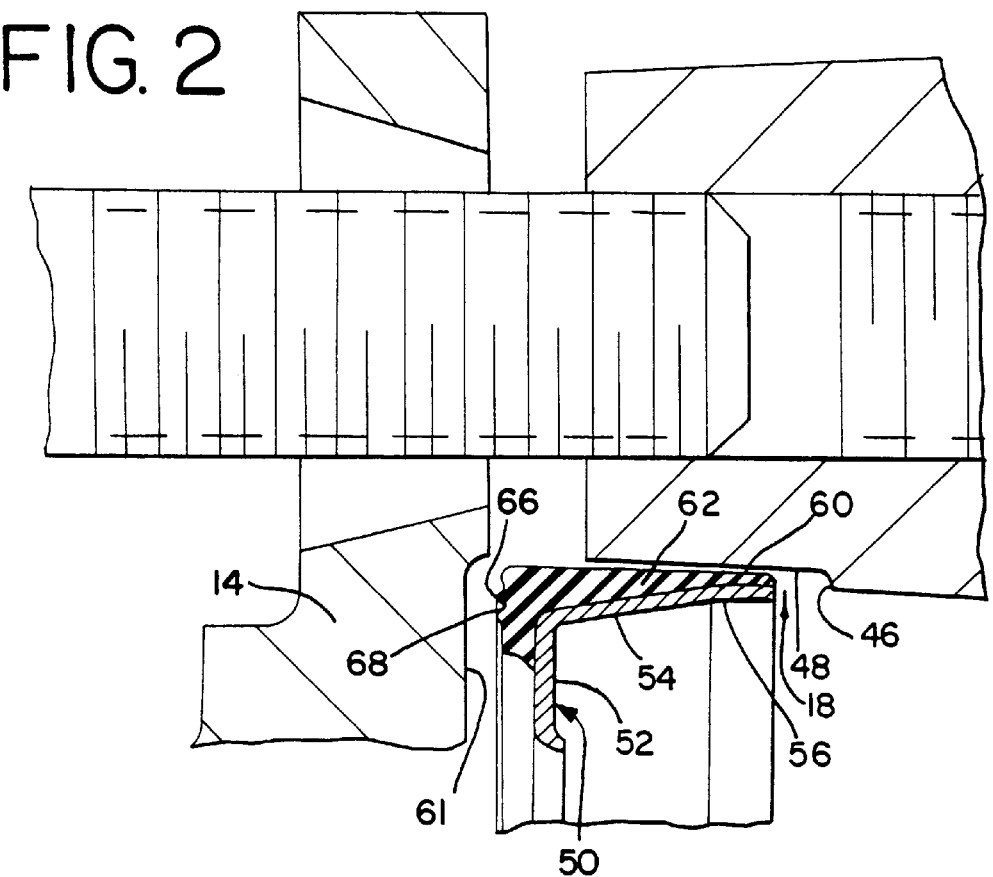
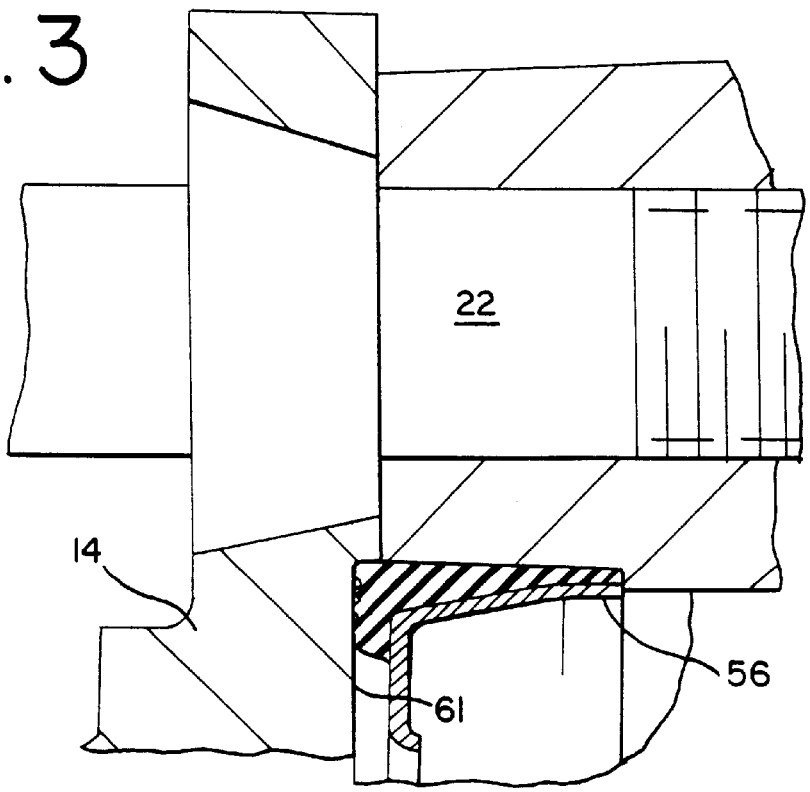

REMOVABLE AND REPLACEABLE HUB SEAL

BACKGROUND OF THE INVENTION

The present invention relates to oil and grease seals and more particularly, to a reusable gasket assembly or composite seal for drive axles.

It is customary today to have a number of trucks or tractors delivered as a unit. In order to save transportation costs, it is customary for one tractor to drive to its destination with several other tractors attached to the same in a "piggyback" formation. In this way, it is not necessary for the tractor to be driven several hundred miles or more when it has no useful load on it.

When operating a "piggy-back" arrangement, it is customary for the axles to be pulled from their housing and placed inside the cab or other suitable location. In order to do this, the bolts holding the axle are pulled and the axles are simply removed for transit. Thereupon, an expedient is relied upon, such as placing some rags or other articles at the ends of the axle housing.

In this way, the differential gears are not required to operate and the wheels may turn without turning the differential gears inside the housing. When one arrives at the destination, the axles are removed from their place of storage and are replaced in the axle housing. Thereupon, the former material situated between the axle and the housing is reused or discarded.

The customary practice in this area has been to use a paper gasket glued to the wheel hub. With the paper gasket, when the axle is removed from the wheel hub, there is the problem of replacing it without leakage, inasmuch as an adhesively affixed gasket invariably causes some of the gasket to be removed with the axle and some to remain on the hub. Therefore, installing a new paper or new gasket material involves scraping and cleaning both of these parts, inserting a new gasket and affixing the axle to the hub. Rushing this task leads to imperfect seals and leakage from the hub.

In another case, the hub may be designed for use with an O-ring, in which case the O-ring is removed, the vehicle is driven, and then the O-ring is replaced. This plan, which is theoretically acceptable, has several practical drawbacks. First, the O-ring is susceptible of stretching and/or losing its installed dimension, especially when placed in storage for a day, a week, or other suitable interval. The second is that, when returning the O-ring to its groove, the ring may not fit exactly into the groove and may thereupon produce a leaking seal between the hub and the axle. This difficulty is exacerbated by the inaccessibility of the O-ring groove once the cap has been placed thereover. Misalignment, and consequent leakage, occurs quite readily with O-ring type seals.

Accordingly, there has been a need for a simple, inexpensive seal or gasket for the axle which would enable the axle to be removed one or more times and replaced without damage thereto or without loss of lubricant. Ideally, such a seal should be relatively inexpensive. Another advantage would be to provide a seal for axle hubs which would be readily removable but completely resealable one or more times.

An ideal seal would be one which fits into a clearly defined space in the hub, and which is removable and reusable without difficulty.

Another advantage of a proper seal would be one wherein the seal would bend or "oil can" outwardly when subjected to an axial force, but which would be freely removable when allowed to spring back by its own innate resiliency to a very slightly smaller dimension so as to be readily removable by hand.

Accordingly, it is an object of the invention to provide an oil seal of improved convenience and reliability for drive axles.

Another object of the invention is to provide a removable oil seal which would fit into a designated counterbore, but which would be readily removable therefrom.

Yet another object of the invention would be to provide a seal with a rubber component and a metal component, which could be forced into an oil-tight sealing position when the axle is snugly installed in the hub.

Still another object of the invention would be to provide a stiffener having a base portion, a slightly angled wall, and a radial flange directed inwardly, and having the o.d. of the seal covered by a bonded rubber component which extends axially beyond the extent of the stiffener or casing, at least in one direction.

A further object of the invention would be to provide a rubber o.d. seal having a pair of sealing beads on its end face, and having a metal stamping or casing including an axial or nearly axial portion, a slightly inclined portion and a third component of the metal which extends radially inwardly and which is partly covered by the rubber forming the seal.

A still further object of the invention is to provide a seal wherein the stamping or casing is made from metal, and wherein the rubber makes contact with the housing and with the axle flange along different, perpendicular surfaces.

The invention achieves its objects by providing a method of sealing an axle flange to a hub which includes forming a counterbore in the hub, placing therein a rubber o.d. seal having an axial portion for engaging the axle end, and wherein this portion is supported by a casing having both an axial and radial component. The invention also achieves its objects by providing a seal with a contoured end face, a sidewall, and a stamping or casing of generally L-shaped configuration, arranged to fit in a counterbore wherein axial deflection will cause limited radial bulging and consequently, a tight fit to the seal.

The manner in which the foregoing and other objects and advantages are achieved in practice will become more clearly apparent when reference is made to the following detailed description of the invention wherein a preferred embodiment of the seal of the invention is set forth by way of example, and wherein such seal is shown in the accompanying drawings, in which like numbers indicate corresponding parts throughout.

BRIEF DESCRIPTION OF THE DRAWINGS

FIG. 2 is a greatly enlarged vertical sectional view of the seal in its relaxed and removable position, showing a very slight working clearance between the seal and the hub counterbore;

FIG. 3 is a figure similar to FIG. 2, but showing the seal installed in the hub counterbore;

DESCRIPTION OF THE PREFERRED EMBODIMENTS OF THE INVENTION

Figure 1:
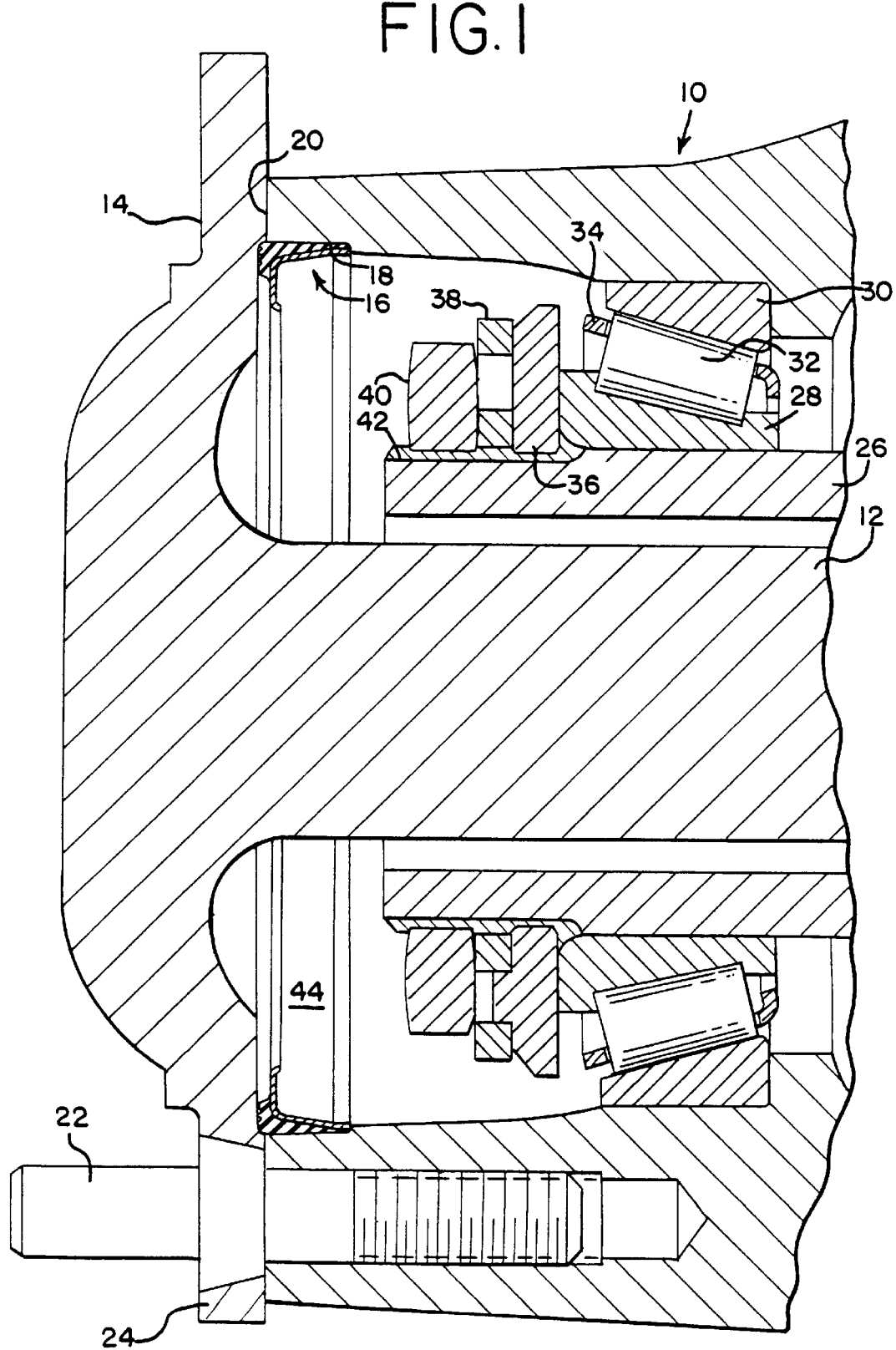
FIG. 1 is a fragmentary vertical sectional view of a portion of a truck axle, having the inventive seal of the present invention in place therein with the axle and its flange in their positions of use.
Figure 4:
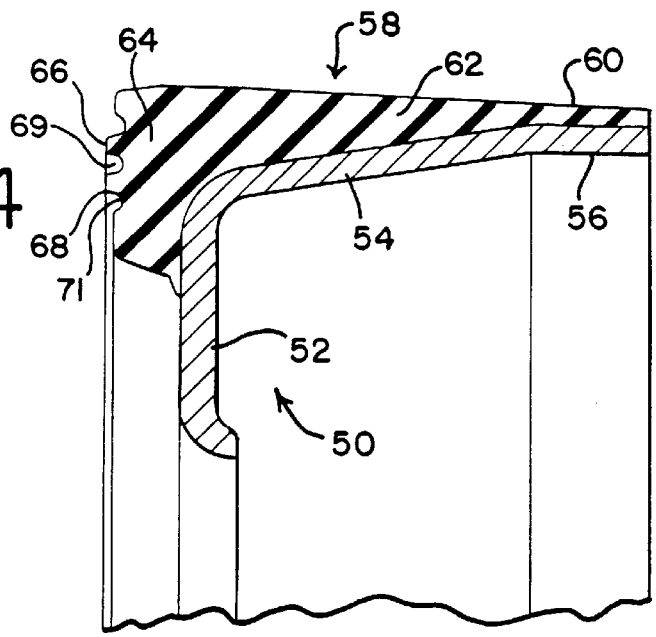
FIG. 4 is a greatly enlarged fragmentary vertical sectional view of the seal of the invention.

Whereas the present invention may take a number of forms and may be applied to different forms of installation, a description thereof will be given wherein the parts to be sealed are the interface at the wheel hub and axle flange of a heavy duty truck or the like.

Referring now to the drawings in greater detail, there is shown an axle hub generally designated 10, with an axle generally designated 12 positioned therein with its flange 14 engaging a seal of the invention generally designated 16. The seal assembly 16 is shown positioned in a counterbore 18, lying inside the end face 20 of the hub 10. The axle flange 14 is secured to the hub 10 by a plurality of fasteners 22 that are spaced around the periphery 24 of the flange 14 of the axle 12.

As is known to those skilled in the art, the hub 10 is affixed rotatably over the end portion of an axle housing 26, where it is held by plural sets of bearings (only one shown for clarity).

The bearings include an inner race 28, an outer race 30 and a plurality of rollers 32 held in place by a cage 34. The bearings are held in place against endwise movement by a ring 36, a spacer 38 and a fastener 40, which cooperates with threads 42 on the end of the axle housing 26.

According to the invention, when it is desired to "piggy-back" the tractor(s), the fasteners 22 are released and the axle 12 and flange are pulled from the housing 10. This leaves a space 44 defined by the counterbore 18 open to the air. This opening is then closed off by suitable means such as by inserting a rag or the like therein, which is adequate to keep oil or grease from leaking out of the opening 44.

When one arrives at the destination, the axle is replaced and its inside end (not shown) is engaged with one of the side gears of a spider gear set, and the axle is then simply bolted in place, using the flange 14 and the fasteners 22.

Installing the seal 16 of the invention in place involves slightly deforming the seal into contact with both the shoulder surface 46 and the wall surface 48 of the counterbore. The casing or stamping generally designated 50 of the seal includes a radial segment 52, a slightly radially inclined but generally axial segment 54 and a further, purely axially extending segment 56, which is paralled to or essentially parallel to the walls of the counterbore 48.

The mass of rubber generally designated 58 includes a thin section 60 covering the axial extent of the casing, a tapering section 62 covering the inclined section 54 of the stamping, and a generally radially disposed segment 64 having a pair of ribs 66, 68 on the face thereof separated by grooves 69, 71. When placing the unit 16 into the counterbore 18, it is necessary to seat the edge of the casing 56 as well as its cover of rubber 60 on the shoulder surface 46. Once the seal is positioned thusly in the counterbore, the flange 14 of the axle is placed in position with its face portion 62 engaging the end face of the seal containing the ribs 66, 68.

Upon fastening the bolts, the end face 61 of the flange is pushed snugly into engagement with the seal, thus causing the flange 54 to bow outwardly in response to the axial compressive load applied to the body 58. The inability of the seal to move beyond the shoulder 46 of the counterbore, in combination with the applied force at the face 61 urges the wall 60 of rubber outwardly and into contact with the wall 48. Upon loosening the confining force on the axle flange 14, the situation is reversed and the seal may be removed by hand. Accordingly, an improved seal is provided that will remain leak-proof indefinitely and may be removed one or more times, as suits the desires of the user.

Preferably, the seal casing is a steel material having a thickness of from about 0.030 to 0.040 inches, more preferably having a thickness of about 0.036 inches. Preferably, the material is steel although aluminum, brass, or other stiff material could be used. The mass of rubber forming the seal body is made from an elastomer, such as NBR, although other rubbers, and in some cases, a thermoplastic elastomer, may be preferred.

Figure 5:
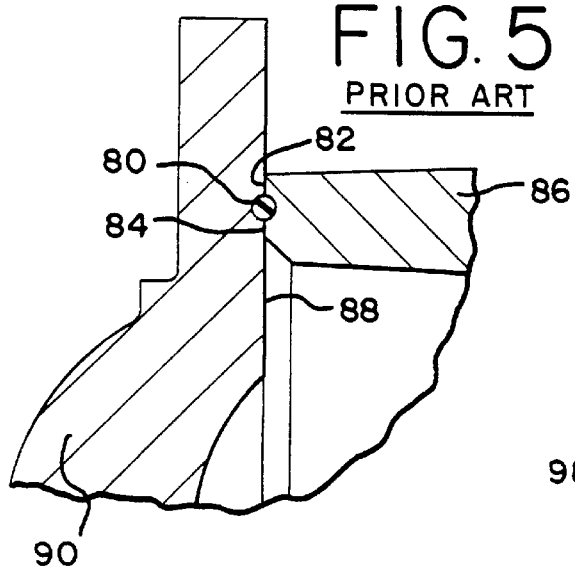
FIG. 5 is a fragmentary sectional view of one form of prior art seal intended for the same purpose.
Figure 6:
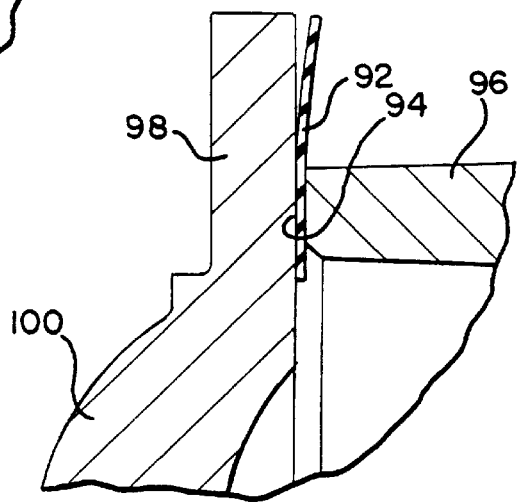
FIG. 6 is a fragmentary sectional view of another form of prior art seal intended for the same purpose.

Referring to FIGS. 5 and 6, these figures show some examples of prior art constructions. In FIG. 5, an O-ring 80 is placed in a groove 82 on the end face 84 of the hub 86. There, it is compressed by the flange 88 of the axle 90. This has the shortcomings of being difficult to install and impossible to determine the exact location of the O-ring as the axle flange is installed over the axle and of the hub end.

FIG. 6 shows a more conventional arrangement in which a paper gasket 92 is inserted between the end portion 94 of the hub 96, and the flange 98 of the axle 100 is positioned thereover. In such arrangement, it was customary to use an adhesive on the gasket, thus making removal and reinstallation highly problematical.

With the present invention, however, installation is easy and very reliable in the sense that the same is positive. The seal may be installed by placing the same in the counterbore where it has a definite location, and merely tightening a flange of the axle in place. Removing the unit is likewise a simple matter.

It will thus be seen that the present invention relates to a reusable gasket seal for drive axles, having a number of advantages and characteristics including those expressly pointed out here, and others which are inherent in the invention. An illustrative embodiment of the seal of the invention having been shown and described, it is anticipated that variations to the described form of apparatus will occur to those skilled in the art and that such modifications and changes may be made without departing from the spirit of the invention, or the scope of the appended claims.

What is claimed is:

1. A hub seal assembly comprising, in combination, a casing unit and an elastomeric seal body, said casing unit being made from a stiff but flexible material having a flange portion extending substantially radially inwardly, and a sleeve portion comprising two elements, a first element being a generally cylindrical but slightly radially outwardly tapering element and a second element being a purely cylindrical element, said first and second elements being formed integrally with each other, said sleeve portion terminating in a free edge, said elastomeric seal body being bonded to and covering at least a portion of said casing radial flange so as to present a radial end face and being generally cylindrical on the outer diameter, being continuous throughout its extent, and being bonded at the inner diameter to said sleeve portion, said elastomeric seal body terminating coextensively with said free edge of said cylindrical element, said seal assembly, when received slidably within a counterbore in said hub and when said end face of said elastomeric seal body is acted upon by an axial confining force resulting from an axle flange engaging said end face of said elastomeric seal body, bulging outwardly into snug sealing engagement with said associated counterbore, and when said confining force is released, being freely removable by hand from said counterbore.

2. A hub seal as defined in claim 1, wherein said end face portion includes at least one land and groove therein to improve the effectiveness of sealing engagement with a part of said axle flange.

3. A hub seal as defined in claim 1, wherein said end face portion includes at least two lands and grooves therein for increased sealing effectiveness when acted upon by said axle flange.

4. A hub seal as defined in claim 1, wherein said stiff but flexible material comprises steel having a thickness of from about 0.040 to about 0.030 inches.

5. A hub seal as defined in claim 1, wherein said thickness of said casing unit is about 0.036 inches plus or minus 0.002 inches.

6. A hub seal as defined in claim 1, wherein said elastomeric seal body is made from a thermoplastic elastomer.

7. A hub and axle seal comprising, in combination, a hub component, an axle component having a radial flange thereon, and a seal assembly adapted to fit snugly but removably within said hub when held in place by said adial flange of said axle, said hub having a counterbore therein including a radial shoulder at the bottom thereof, said seal assembly having a one-piece casing made from metal and including a radial flange section, and a sleeve portion comprising two elements, a first element being a generally cylindrical but slightly radially outwardly tapering element and a second element being a purely cylindrical element, said first and second elements being formed integrally with each other, said sleeve portion terminating in a free edge, said elastomeric body being bonded to and covering at least a portion of said casing radial flange so as to present a radial end face and being generally cylindrical on the outer diameter, being continuous throughout, and being bonded at the inner diameter to said sleeve portion, said elastomeric body terminating coextensively with said free edge of said cylindrical element, said seal assembly, when received slidably within a counterbore in said hub and when said end face of said elastomeric seal body is acted upon by an axial confining force resulting from an axle flange engaging said end face of said elastomeric body, bulging outwardly into snug sealing engagement with said associated counterbore, and when said confining force is released, being freely removable by hand from said counterbore.

8. A hub and axle seal as defined in claim 7, wherein said casing is made from a metal material having a thickness of about 0.030 to about 0.040 inches.

9. A hub and axle seal as defined in claim 7, wherein the thickness of said casing is about 0.036 plus or minus 0.002 inches.

10. A hub and axle seal as defined in claim 7, wherein said end face includes from one to about three lands and grooves in said end face.

11. A hub and axle seal as defined in claim 7, wherein said end face includes two lands and grooves in said end face.

* * * * *